June 22, 1965  N. C. STILWELL  3,190,663
STATIC SEAL CONSTRUCTION

Filed June 5, 1962  2 Sheets-Sheet 1

INVENTOR.
Neil C. Stilwell
BY
ATTORNEYS

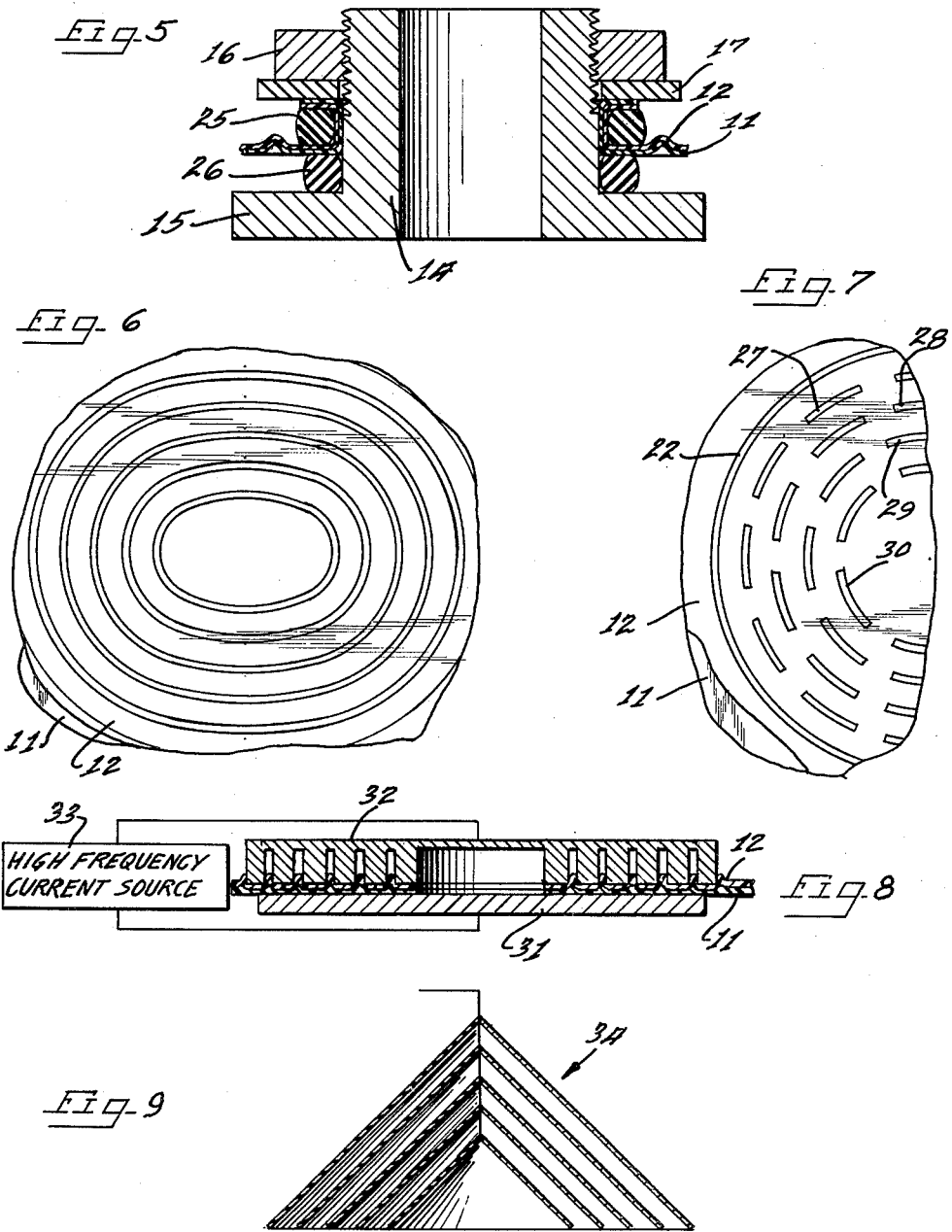

United States Patent Office 3,190,663
Patented June 22, 1965

3,190,663
STATIC SEAL CONSTRUCTION
Neil C. Stilwell, P.O. Box 752, Kokomo, Ind.,
Filed June 5, 1962, Ser. No. 200,216
12 Claims. (Cl. 277—227)

This invention relates generally to a static seal between a flexible sheet and a rigid fitting, and more specifically to an improved plastic sheet construction at such fitting for rendering the connection therebetween fluid tight.

Although the principles of the present invention may be included in various devices, a particularly useful application is made between a flexible plastic liner of a tank and the plumbing connected thereto. Where a plastic liner is employed in a tank, its purpose is to protect the interior of the tank from exposure to the fluid contents. Although the bag may be tight, a problem arises in establishing a fluid tight connection between the plastic liner and plumbing leading thereto, it being necessary that the seal construction be such that there can be no possible leakage through the seal into the interior of the tank. In particular, it is necessary to have a connection which can be freely disassembled and reassembled whenever the occasion warrants using only ordinary hand tools to do so. Heretofore, it has been found that when a mechanical force has been applied in the vicinity of an aperture through such plastic material, the plastic has tended to extrude radially outwardly to such an extent that the resulting connection is unreliable from a leakage standpoint.

The present invention contemplates the provision of a series of concentric rings in one layer, or bonds or heat-seals between two layers of plastic material which surround the opening which is to be provided with the fitting. By such structure, I have found that whereas one out of five previous seals were susceptible to leakage, no leakage has been found in a large number of connections made in accordance with the principles of this invention.

Accordingly, it is an object of the present invention to provide a static seal.

Another object of the present invention is to provide a static seal for plastic sheeting, which seal may be freely assembled and disassembled by means of ordinary hand tools.

Yet another object of the present invention is to provide a construction for a seal which at the outset is optionally usable.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

On the drawings:

FIGURES 4 and 5 are modifications of the construction shown in FIGURE 1;

FIGURES 6 and 7 are modifications of the structure shown in FIGURE 2; and

Figure 2:
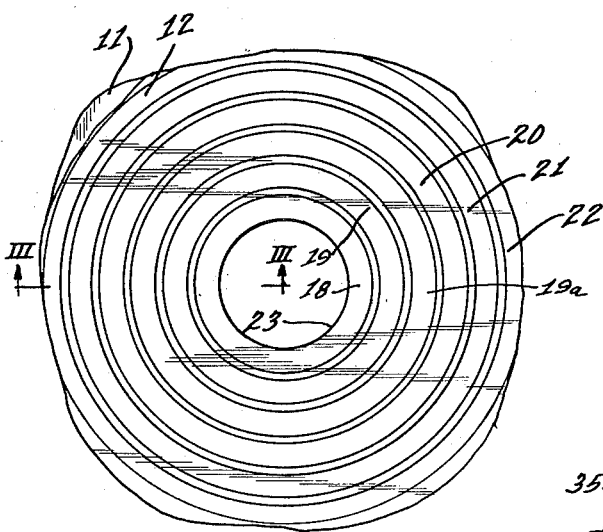
FIGURE 2 is a plan view of the plastic portion of the seal shown in FIGURE 1.

FIGURES 8 and 9 comprise diagrammatic representations of structure for forming the construction of FIGURE 2.

Figure 1:
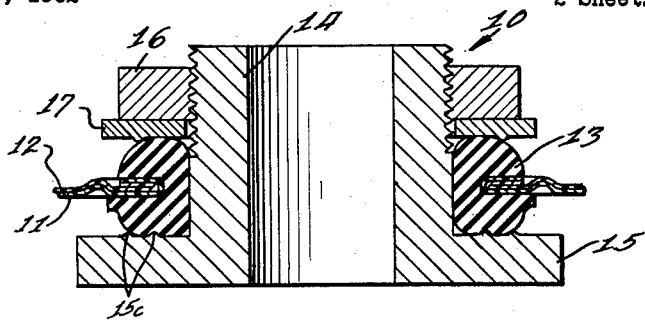
FIGURE 1 is an enlarged cross-sectional view taken through a seal provided in accordance with the principles of the present invention.

As shown on the drawings:

The principles of this invention are particularly useful when embodied in a static seal construction such as illustrated in FIGURE 1 generally indicated by the numeral 10. The static seal 10 includes a first layer 11 of plastic and a second layer 12 of plastic having an aperture receiving a rubber grommet 13. The grommet 13 is carried on the outer diameter of an annular fitting 14 having a rigid flange 15. A nut 16 acting through a rigid washer 17 serves to clamp the annular grommet 13 against the plastic layers 11 and 12.

The plastic layers 11, 12 each comprise elastic heat sealable material of thin section, the thickness of which has been exaggerated in the drawing for clarity. A specific example by which this invention can be advantageously practiced includes the use of vinyl plastic layers, each about .016 inch in thickness. This plastic material is elastic and is heat sealable.

The layers 11 and 12 may be coextensive so that the same may comprise a double thickness bag or other item. In certain instances, a single thickness 11 is sufficient for the bag or liner in general, and if so, the plastic layer 12 comprises a disk secured to the layer 11 as described in detail below.

Referring to FIGURE 2, there is shown a plan view of the plastic layers 11, 12 as seen in FIGURE 1 prior to assembly. This structure comprises a layer 12 which is a disk or patch secured by a series of radially spaced heat seals 18–22 which are substantially concentric with each other and which have a relatively large radial extent as compared to their radial spacing. At manufacture, a central opening 23 may be omitted so that the item which includes the plastic layer 11 may have a number of layers or disks 12 disposed at various points thereon for selective use depending upon the structure with which the same is to be associated. It is evident that if the aperture 23 is not provided, the presence of the layer 12 is in no way harmful. However, when it is desired to make a fluid-tight connection with the item having the layer 11, the central portion is cut out to provide the aperture 23 which surrounds the grommet 13. In a typical embodiment, the heat seal 18 could be made to have an outside diameter of three-quarters inch, with the successive heat seals 19–22 ranging in size up to one and three-quarters inch diameter.

Each of the heat seals 18–22 thus comprises a reduced thickness zone of altered resistance to stretching connected by annular connecting portions or rings of increased thickness between the heat-sealed zones which connecting portions have an oppositely altered resistance to stretching. It is believed that this difference in resistance to stretching comes about as schematically illustrated in FIGURE 3.

Figure 3:
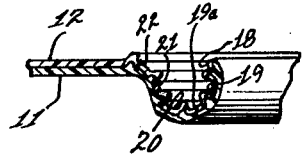
FIGURE 3 is a fragmentary cross-section taken along line III—III of FIGURE 2 when the same is distorted.

FIGURE 3 represents a radial cross-section of the structure shown in FIGURE 2, but distorted at its center as if by receiving a grommet or fitting having an external size greater than the size of the aperture. Thus, each of the heat seals or connecting rings acts much like a rubber band which is under tension, or like a garter, and tends to draw the aperture to a smaller size. This radially inward force is sufficiently great so that when a clamping force is applied to the grommet 13, the plastic sheet or sheets do not extrude outwardly, and are entirely leak resistant.

Figure 4:
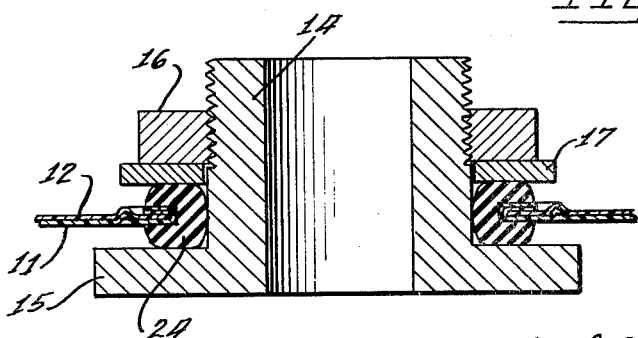

I have found that there is no particular form of grommet necessary to practice the instant invention. By way of example, there is illustrated in FIGURE 4 a grommet 24 which has an external profile similar to a standard O-ring, but with a peripheral outwardly opening groove receiving the plastic layers 11 and 12.

Further, the use of a grommet per se is not absolutely essential and an equivalent structure is shown in FIG- URE 5 wherein the grommets 13 and 24 have been replaced by a pair of O-rings 25, 26, the plastic layer 11 directly engaging the peripheral surface of the fitting 14, and the O-ring 26 being optional.

In FIGURE 1, the bottom of the groove in the grommet 13 has a diameter larger than the free diameter of the aperture in the plastic layers 11 and 12. A similar relationship applies to the grommet of FIGURE 4. Similarly, the outside diameter of the fitting 14 is greater than the free size of the aperture in the plastic layers 11, 12 in FIGURE 5. In FIGURES 1 and 4, the plastic serves to draw the rubber grommets radially inward to compress them against the fitting 14, while in FIGURE 5, the plastic directly engages the fitting 14. In all forms, the clamping member 16, illustrated for convenience as being a nut, creates a seal between the plastic and the rubber and the plastic does not extrude radially outwardly, due to the concentric heat seal rings or bonds. If desired, a number of annular rings 15c may be provided integral with the flange 15 to further minimize the likelihood of radial extrusion of the grommet 13.

In FIGURE 6, there is illustrated a variation of the structure shown in FIGURE 2 wherein the heat seals are oval-shaped for use as on an inspection plate of oval configuration, the length of the major diameter of which may comprise several inches.

In FIGURE 7 there is illustrated a further variation of the structure shown in FIGURE 2 which includes the layers 11 and 12 as before, and with the heat seal 22 as before. However, associated therewith, there is a series of interrupted heat seals 27–30, each comprising a number of arcs, and wherein the arcs of adjacent rows may be staggered as illustrated. In the event that the elastic material employed has too great a resistance to stretching with a heat seal pattern such as shown in FIGURE 2, the pattern shown in FIGURE 7 may be employed so that each successive heat seal gives slightly less tension. However, it is preferred that there be one continuous heat seal 22 to preclude any fluid leakage between the layers 11 and 12.

The heat seals, rings, or bonds thus far described comprise successive rings which are alternately thicker and thinner in thickness. Ordinarily, each thermoplastic bond comprises an annular area of reduced thickness. The material originally present at such area flows radially, during heat sealing, to the connecting portions, which thus ordinarily grow slightly in thickness in an axial direction due to reception of plastically flowing material.

Figure 3A:
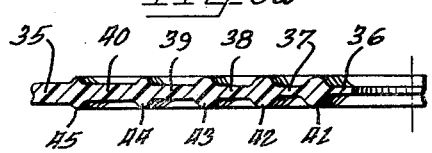
FIGURE 3a is a fragmentary cross-section of a further embodiment of my invention, taken similarly to FIGURE 3, but illustrated in its free state.

This type of structure may be provided on opposite faces of each illustrated and described seal, each of which may comprise a single thickness of plastic material, both such features being shown in FIGURE 3a. Where a single layer of thermoplastic material is employed, each "heat seal" or ring has all the properties described above, except that it does not bond together two layers of material. However, the term "heat seal" is employed to reflect the physical properties obtained by its method of manufacture.

In FIGURE 3a, a sheet of material 35, shown in exaggerated thickness, is provided with a series of concentric double-faced "heat seals" or rings 36–40 spaced from each other by a series of connecting rings 41–45 of a thickness greater than the sheet 35. In this form, the cross-sectional area from each seal 36–40 to the adjacent connecting ring 41–45 changes, and therefore the yieldability of successive elements varies, as does the yieldability of successive rings 41–45.

The heat-formed rings 36–40 successively have an increasing radial length as well as an increasing resultant thickness, while the heat-formed rings 41–45 successively have an oppositely changing or decreasing radial cross-sectional area.

In FIGURE 8 there is illustrated diagrammatically a structure such as may be employed to provide the heat seal pattern of FIGURE 2. The plastic layers 11 and 12 are disposed between electrodes 31, 32 connected to a suitable source of high frequency current 33. The electrode 32 includes a number of concentric rings having an arrangement corresponding to the pattern of FIGURE 2, or more generally, having an arrangement corresponding to the pattern desired to be produced. By use of an additional electrode 32 in place of the electrode 31, dual treated faces may be provided as shown in FIGURE 3a. A variation in the structure of the electrode 32 is shown in FIGURE 9 and generally indicated at 34. It is evident that slotting of certain rings would produce a selected amount of pattern interruptions and staggering.

By providing a relatively large number of concentric rings or heat seals 18–22 as illustrated in FIGURE 2, the resulting structure can be cut to various sizes to accommodate various size fittings. However, it is preferred that a plurality of annular rings or heat seals be left intact to perform as described herein. A number of fittings such as 14 may be used at different locations, and two or more can be joined to form a unitary fitting having a plurality of portions corresponding to that illustrated at 14.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In a static seal construction:
   (a) a pair of separate sheet-like layers of elastic heat sealable material having means providing an aperture therethrough; and
   (b) a plurality of radially spaced heat seals joining said layers together and extending about the aperture in substantially concentric relation to each other.

2. In a static seal construction:
   (a) at least one sheet of elastic thermoplastic material having an aperture therethrough;
   (b) a plurality of concentric rings integral with said sheet and encircling said aperture;
   (c) means integral with said sheet joining said rings together and being of a thickness different from that of said rings; and
   (d) annular means extending through said aperture and having an outer periphery substantially concentric with said rings and of a size larger than the free size of the smallest of said rings.

3. In a static seal construction:
   (a) at least one sheet of elastic thermoplastic material having means providing an aperture therethrough;
   (b) a plurality of concentric rings integral with said sheet and encircling said aperture and including at least one ring comprising a series of angularly spaced arcs, and a continuous ring surrounding said one ring; and
   (c) means integral with said sheet joining said rings together and being of a thickness different from that of said rings.

4. In a static seal construction:
   (a) at least one sheet of elastic thermoplastic material having means providing an aperture therethrough;
   (b) a plurality of concentric rings integral with said sheet and encircling said aperture and including a first ring comprising a series of angularly spaced arcs, a second ring comprising a series of angularly spaced arcs spanning the angular gaps between the arcs of said first ring, and a third ring extending continuously around said first and second ring; and
   (c) means integral with said sheet joining said rings together and being of a thickness different from that of said rings.

5. In a static seal construction:
   (a) a pair of separate sheet-like layers of elastic material having means providing an aperture therethrough; and (b) a series of radially spaced bonds between said layers defining concentric zones of said material of greater resistance to stretching extending about the aperture and spaced from each other by unbonded zones of said material having lesser resistance to stretching.

6. In a static seal construction:
(a) at least one sheet of elastic thermoplastic material having an aperature therethrough;
(b) a plurality of concentric rings integral with said sheet and encircling said aperture;
(c) means integral with said sheet joining said rings together and being of a thickness different from that of said rings;
(d) a resilient grommet having an outer circumferential groove receiving at least one of said rings, the bottom of said groove having an effective diameter greater than that of the free size of said one ring; and
(e) means clamping said grommet axially against said sheet of elastic material.

7. In a static seal construction:
(a) at least one sheet of elastic thermoplastic material having an aperture therethrough;
(b) a plurality of concentric rings integral with said sheet and encircling said aperture;
(c) means integral with said sheet joining said rings together and being of a thickness different from said rings;
(d) annular means extending through said aperture and having an outer periphery substantially concentric with said rings and of a size larger than the free size of the smallest of said rings; and
(e) resilient means clamped axially against said sheet of elastic material adjacent to said aperture.

8. In a static seal construction:
(a) a pair of separate thin layers of vinyl plastic material having an aperture therethrough;
(b) a series of several radially spaced circular heat seals of greater radial extent than their radial spacing, said heat seals joining said layers together and defining concentric zones of greater resistance to stretching extending about said aperture and spaced from each other by unsealed zones having lesser resistance to stretching;
(c) a resilient grommet having an outer circumferential groove receiving at least one of said heat seals, the bottom of said groove having an effective diameter greater than that of the free size of said one heat seal; and
(d) means clamping said grommet axially against said plastic material.

9. In a static seal construction:
(a) at least one sheet of elastic thermoplastic material having means providing an aperture therethrough;
(b) a plurality of concentric rings of said material integral with said sheet and encircling said aperture; and
(c) means of said material integral with said sheet and joining said rings together and being of a thickness different from that of said rings.

10. In a static seal construction:
(a) at least one sheet of elastic thermoplastic material having means providing an aperture therethrough;
(b) a first plurality of concentric rings integral with said sheet and encircling said aperture, each of said rings having a thickness less than that of said sheet; and
(c) a second plurality of rings integral with and thicker than said sheet, and disposed connectively between said first plurality of rings.

11. In a static seal construction:
(a) at least one sheet of elastic thermoplastic material having means providing an aperture therethrough; and
(b) a series of radially spaced concentric rings extending about said aperture and comprising concentric zones of said material of greater resistance to stretching spaced from each other by concentric zones of said material of lesser resistance to stretching.

12. In a static seal construction:
(a) at least one sheet of elastic thermoplastic material having means providing an aperture therethrough; and
(b) a series of radially spaced concentric rings extending about said aperture and each having a radial cross-sectional area spaced from each adjacent ring by a zone having a cross-sectional area different from that of said first named cross-sectional area.

References Cited by the Examiner

UNITED STATES PATENTS

| | | | |
|---|---|---|---|
| 126,624 | 5/72 | Coffee | 277—211 |
| 138,633 | 5/73 | Giffard | 277—207 |
| 1,669,030 | 5/28 | Wilkinson | 277—233 |
| 1,676,432 | 7/28 | Dieterick | 277—233 |
| 2,003,934 | 1/35 | Hansel | 277—233 |
| 2,255,504 | 9/41 | Current | 277—233 |
| 2,774,621 | 12/56 | Kilbourne | 277—209 |
| 3,094,337 | 6/63 | Pipert et al. | 277—227 |

FOREIGN PATENTS

| | | |
|---|---|---|
| 809,268 | 2/37 | France. |
| 1,118,630 | 6/56 | France. |
| 1,184,480 | 7/59 | France. |
| 547,066 | 8/42 | Great Britain. |

EDWARD V. BENHAM, *Primary Examiner.*